(12) United States Patent
Kunert et al.

(10) Patent No.: US 9,109,569 B2
(45) Date of Patent: Aug. 18, 2015

(54) WORKING APPARATUS AND A METHOD FOR OPERATING SAME

(75) Inventors: Niels Kunert, Ottenbach (DE); Jürgen Aupperle, Berglen (DE); Michael Grether, Waiblingen (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 723 days.

(21) Appl. No.: 13/474,965

(22) Filed: May 18, 2012

(65) Prior Publication Data

US 2012/0297631 A1 Nov. 29, 2012

(30) Foreign Application Priority Data

May 25, 2011 (DE) .......................... 10 2011 103 125

(51) Int. Cl.

| F02P 5/00 | (2006.01) |
|---|---|
| F02P 5/15 | (2006.01) |
| F02P 5/02 | (2006.01) |
| F02P 5/04 | (2006.01) |
| F02P 3/055 | (2006.01) |
| F02B 63/02 | (2006.01) |

(52) U.S. Cl.
CPC ................ *F02P 5/1508* (2013.01); *F02P 5/02* (2013.01); *F02P 5/1504* (2013.01); *F02B 63/02* (2013.01); *F02D 2400/06* (2013.01); *F02P 3/055* (2013.01); *F02P 5/04* (2013.01); *F02P 5/1506* (2013.01); *Y02T 10/46* (2013.01)

(58) Field of Classification Search
CPC ............. F02P 5/15; F02P 5/1508; F02P 5/15; F02P 5/00; F02P 5/02; F02P 5/04; F02P 5/1502

USPC ................ 123/406.12, 406.5, 406.51, 406.52
See application file for complete search history.

(56) References Cited

U.S. PATENT DOCUMENTS

| 3,556,064 A * | 1/1971 | Date et al. ..................... 123/329 |
| 3,596,644 A * | 8/1971 | Hutchins ................... 123/406.71 |
| 3,603,298 A * | 9/1971 | Toda et al. ..................... 123/329 |
| 3,730,154 A * | 5/1973 | Vartanian .................... 123/406.7 |
| 4,633,834 A * | 1/1987 | Takeuchi et al. .......... 123/406.53 |
| 4,844,034 A * | 7/1989 | Honjo et al. .............. 123/406.52 |
| 5,105,785 A * | 4/1992 | Okuda ....................... 123/406.52 |
| 5,775,297 A * | 7/1998 | Koike et al. ............... 123/406.51 |
| 2006/0086337 A1* | 4/2006 | Nickel ............................ 123/335 |
| 2009/0012699 A1* | 1/2009 | Bahner et al. .................. 701/105 |
| 2011/0000462 A1* | 1/2011 | Ostojic et al. ............ 123/406.23 |
| 2012/0304966 A1* | 12/2012 | Fong et al. ............... 123/406.23 |

FOREIGN PATENT DOCUMENTS

DE 38 17 471 C1 11/1989

* cited by examiner

*Primary Examiner* — Thomas Moulis
(74) *Attorney, Agent, or Firm* — Paul D. Strain, Esq.; Strain & Strain PLLC

(57) ABSTRACT

A working apparatus has an internal combustion engine which drives at least one tool via a clutch. The clutch starts the coupling process at an initial engagement speed when the internal combustion engine is accelerated. The internal combustion engine has a piston, an ignition device and an ignition timing control device. The control device provides a first ignition timing for idling and a second ignition timing for full load operation, which is earlier than the first ignition timing. A method for operating the working apparatus provides that the ignition timing is adjusted toward "late," with respect to the first ignition timing, when the engine speed drops in a first speed range above the idling speed and below the initial engagement speed.

16 Claims, 3 Drawing Sheets

WORKING APPARATUS AND A METHOD FOR OPERATING SAME

CROSS-REFERENCE TO RELATED PATENT APPLICATIONS

This application is based upon and claims the benefit of priority from prior German Patent Application No. 10 2011 103 125.5, filed May 25, 2011, the entire contents of which are incorporated herein by reference in their entirety.

BACKGROUND

The present invention relates to a working apparatus, especially a motor-driven tool, and to a method for operating a working apparatus of this general type. In general, the working apparatus has an internal combustion engine which drives at least one tool via a clutch, wherein the clutch initiates the clutch engagement process at a lower or initial engagement speed when the internal combustion engine is accelerated. The usual internal combustion engine has a piston, an ignition device and an ignition control device for controlling the ignition timing, such that a first ignition timing is provided for idling and a second ignition timing is provided for full load operation, wherein the second ignition timing is "earlier" than (advanced with respect to) the first ignition timing.

Machines having a tool which is driven by an internal combustion engine are well known. For example, DE 38 17 471 C1 describes an ignition system for the internal combustion engine in a working apparatus of this kind. The ignition system is provided with different characteristic curves for determining the ignition timing to be used for low speeds below the idling speed, specifically depending on whether the internal combustion engine has just been started (cold) or is in normal operation (warm).

If the supply of combustion air and fuel is heavily throttled in an internal combustion engine operating at full load, for example, because a throttle flap is suddenly closed, the speed drops. Depending on the design of the engine, the drop in speed can take place in rich mode (rich come down) or in lean mode (lean come down).

If biofuel varieties which have a high alcohol content are used, the behavior of an internal combustion engine during the drop in speed can change. Thus, an internal combustion engine which decelerates in rich mode when using conventional fuel can decelerate in lean mode with biofuel. In the event of a lean drop in speed, the internal combustion engine can remain for an undesired long time at a high speed level. This is perceived audibly by the operator and is undesirable.

SUMMARY OF THE INVENTION

One object underlying the present invention is to provide an improved working apparatus, which has improved operating performance irrespective of the type of fuel being used to operate the apparatus.

A further object of the present invention is to provide an improved method for operating a working apparatus of the type mentioned above, in order to achieve good running behavior independently of the fuel variety used.

In accomplishing these and other objects, there has been provided, in accordance with one aspect of the present invention, a working apparatus, comprising an internal combustion engine and a clutch which drives at least one attachable tool via the clutch. The clutch begins a clutch engagement process at an initial engagement speed when the internal combustion engine is accelerated. The internal combustion engine includes a piston, an ignition device and an ignition control device which is programmed to control ignition timing to provide a first ignition timing for idling and a second ignition timing for full load operation, wherein the second ignition timing is earlier than the first ignition timing. The ignition control device is further programmed so that, in response to a relatively sudden deceleration of the engine during operation of the apparatus, the ignition control device adjusts ignition timing toward "late," with respect to the first ignition timing, when the engine speed drops to a level in a first speed range that lies above the idling speed and below the initial clutch engagement speed.

In accordance with another aspect of the invention, there is provided a method for operating a working apparatus that includes an internal combustion engine which drives at least one tool via a clutch, wherein the clutch begins a clutch engagement process at an initial engagement speed when the internal combustion engine is accelerated, wherein the internal combustion engine includes a piston, an ignition device and an ignition control device controlling ignition timing to provide a first ignition timing for idling and a second ignition timing for full load operation, wherein the second ignition timing is earlier than the first ignition timing. The method comprises operating the apparatus in a manner that results in a relatively sudden deceleration of the engine, and, in response to said sudden deceleration of the engine, adjusting ignition timing toward "late," with respect to the first ignition timing, when the engine speed drops to a level in a first speed range above the idling speed and below the initial clutch engagement speed.

Further objects, features and advantages of the present invention will become apparent from the exemplary embodiments of the invention that are explained in the detailed description that follows, when considered together with the accompanying figures of drawing,

DETAILED DESCRIPTION OF PREFERRED EMBODIMENTS

Figure 1:
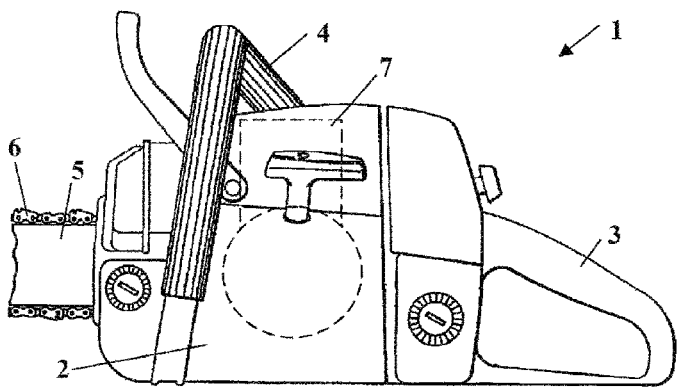
FIG. 1 is a schematic side view of a chainsaw, representing one embodiment of the invention.

It has been demonstrated according to the invention that as a result of a "late" adjustment (a retardation or adjustment toward TDC) of the ignition timing when the speed drops to within a speed range above the idling speed and below the engagement speed, the internal combustion engine combusts more often, but it combusts more weakly. As a result, the speed reduces rapidly, and the speed drops quickly to the idling speed, even in the event of a lean come down. In the event of a rich come down, i.e., during a rich deceleration of the internal combustion engine, the speed drops very rapidly to speeds below the idling speed, and thus the "late" adjustment of the ignition timing in the speed range between the idling speed and the engagement speed does not have a negative effect on rich deceleration of the engine. As a result, good running behavior can be achieved in a simple manner, just by changing the characteristic curve stored in the control device, and specifically, independently of whether the user uses biofuel or conventional fuel. In this context, the term "speed drop" refers to a relatively rapid deceleration of the engine, for example, of the type that occurs when the throttle is suddenly released.

Advantageously, in the first speed range the ignition timing is adjusted to a third ignition timing of about 3° to about 8° before top dead center (TDC). A third ignition timing of about 5° before TDC has been found to be particularly advantageous. In this embodiment, the ignition timing is constant over the entire first speed range.

Advantageously, at least a first characteristic curve for decelerating the internal combustion engine is stored in the control device, with this first curve setting the ignition timing depending on the speed. The expression "characteristic curve" means in this case any assignment which assigns a fixed ignition timing to each speed. The characteristic curve can be stored in the control device in any desired form, for example, as assignment rules, as an algorithm, as a tabular assignment or the like. Advantageously, the ignition timing is adjusted to the third, "late" ignition timing until the speed reaches a first speed, which is higher than the idling speed, and when this speed is reached the ignition timing is determined according to the third characteristic curve. If the speed drops even further from the first speed, no further "late" adjustment is provided, even when the ignition timing continues to be determined on the basis of the first characteristic curve. Advantageously, at speeds below the first speed, the ignition timing is the first ignition timing, i.e., the ignition timing for idling.

Advantageously, a second characteristic curve, according to which the ignition timing is determined in at least one speed range during acceleration, is stored in the control device. Accordingly, separate characteristic curves for acceleration and deceleration are stored in the control device. Advantageously, in a second speed range above the idling speed and below the lower or initial engagement speed, the ignition timing is adjusted toward "late," with respect to the first ignition timing, at which time the ignition timing is determined on the basis of the second characteristic curve. The first speed range, in which a "late" adjustment of the ignition timing occurs on the basis of the first characteristic curve, and the second speed range, in which a "late" adjustment occurs on the basis of the second characteristic curve, advantageously overlap one another in this case. A "late" adjustment of the ignition timing is not necessary in the event of acceleration. However, the range between the idling speed and the lower engagement speed is passed through very quickly during acceleration, and thus no negative effects of the "late" adjustment of the ignition timing occur during acceleration. The "late" adjustment of the ignition timing on the basis of the second characteristic curve is expedient for the case in which the operator starts acceleration in the second speed range. During acceleration, the ignition timing is determined on the basis of the second characteristic curve. In order to avoid the ignition timing being adjusted toward "early" during the switch-over from the first to the second characteristic curve, it is provided that the second characteristic curve, too, has a range between the idling speed and the lower engagement speed, in which the ignition timing is adjusted toward "late".

Advantageously, in the second speed range above a second speed which is higher than the first speed, the ignition timing is adjusted toward "late," with respect to the first ignition timing, at which time the ignition timing is determined according to the second characteristic curve, i.e., the characteristic curve for acceleration. At speeds which are lower than the second speed and higher than the first speed, the ignition takes place expediently at the first ignition timing, i.e., at the ignition timing for idling, at which time the ignition timing is determined on the basis of the second characteristic curve. On account of the fact that the "late" adjustment takes place in the event of the second characteristic curve only starting from a second speed which is higher than the first speed, it can be ensured that the "late" adjustment has little effect on acceleration. On account of the fact that the first speed range (in which a "late" adjustment of the ignition timing takes place upon detection of a rapid deceleration) extends as far as a first speed close to the idling speed, it is ensured that the idling speed is reached quickly in the event of a lean come down. The different requirements for acceleration and deceleration can readily be met as a result of the fact that different characteristic curves for the ignition timing are provided for acceleration and deceleration.

Advantageously, in the event of acceleration from the lower (initial) engagement speed, the ignition timing is adjusted continuously toward "early" until the second ignition timing is reached. In this case, the first and the second characteristic curves advantageously coincide at speeds above the lower engagement speed. A common characteristic curve for acceleration and deceleration is thus sufficient for the speed range above the lower engagement speed. In the second speed range, too, the two characteristic curves advantageously coincide.

Following deceleration of the internal combustion engine, it must be ensured that a subsequent acceleration process can readily take place. To this end, it is provided that, in the event of a drop in speed below a third speed which is higher than the lower engagement speed, the ignition timing is first of all determined on the basis of the first characteristic curve, i.e., the characteristic curve for a drop in speed, and, after a switch-over criterion has been met, ignition timing is determined on the basis of the second characteristic curve, i.e., the characteristic curve for acceleration. In one preferred embodiment, a switch-over criterion is the dropping of the speed below a fourth speed and the reaching of a predetermined number of successive engine cycles during which the ignition timing was determined according to the first characteristic curve. The fourth speed is in particular lower than the idling speed. Advantageously, a further switch-over criterion is the reaching of a second number of successive engine cycles during which the ignition timing was determined according to the first characteristic curve, wherein the second number of cycles is higher than the first number. Accordingly, switching over from the second to the first characteristic curve takes place either when the fourth speed has been reached after a comparatively small first number of engine cycles, or when the ignition timing has already been determined on the basis of the first characteristic curve over a comparatively large second number of engine cycles, in which case the switch-over then takes place independently of the speed reached.

At speeds below the idling speed, it must be ensured that the engine does not stop during a rich come down. To this end, it is provided that, when the speed drops below a fifth speed (which is lower than the idling speed), the ignition timing is adjusted toward "early" to a fourth ignition timing, at which time the ignition timing is determined on the basis of the first characteristic curve, i.e., the characteristic curve for a drop in speed. As a result, the speed rises again. By adjusting the ignition timing toward "early", an excessively rich mixture in the internal combustion engine can furthermore be counteracted. Advantageously, in the event of acceleration from a speed below the idling speed until a fifth ignition timing is reached, the ignition timing is adjusted continuously toward "early," at which time the ignition timing is determined on the basis of the second characteristic curve, i.e., the characteristic curve for acceleration, and, after a sixth speed is reached, is adjusted toward "late" to the first ignition timing, i.e., the ignition timing for idling. As a result, good acceleration behavior can be achieved, in particular when the internal combustion engine is started. The fifth ignition timing is in this case advantageously earlier than the fourth ignition timing.

Turning now to the drawings, FIG. 1 shows a chainsaw 1 as an exemplary embodiment of a working apparatus according to the invention, in particular, a handheld working apparatus. The presently proposed method is also advantageous in other motor-driven tools, in particular in other handheld tools, such as cut-off grinders, brush cutters or the like.

The chainsaw 1 has a housing 2, on which a rear handle 3 and a bale handle 4 for guiding the chainsaw 1 are arranged. Arranged on the housing 2 is a guide bar 5 which projects forwardly and on which a saw chain 6 is arranged. The saw chain 6 is driven in circulation around the guide bar 5 by an internal combustion engine 7 arranged in the housing 2.

Figure 2:
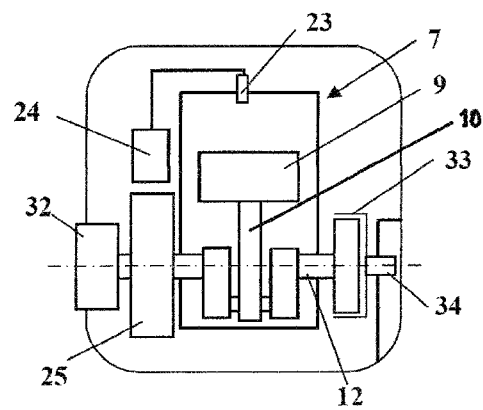
FIG. 2 is a schematic sectional view through the chainsaw of FIG. 1, illustrating certain components.

As FIG. 2 shows, the internal combustion engine 7, which in the exemplary embodiment is a one-cylinder two-stroke engine, has a piston 9, which drives a crankshaft 12 in rotation via a connecting rod 10. Arranged on the crankshaft 12 is a flywheel 25, which can be formed so as to serve at the same time as a fanwheel for delivering cooling air. On the side of the flywheel 25 that is remote from the internal combustion engine 7, a starter device 32 for starting the internal combustion engine 7 is arranged. At the circumference of the flywheel 25, an ignition module 24 is arranged, which supplies a spark plug 23 with ignition voltage. On the side of the internal combustion engine 7 opposite the flywheel 25, a clutch 33 is connected to the crankshaft 12, the clutch 33 being configured as a centrifugal clutch in the exemplary embodiment. Arranged on the drive or output side of the centrifugal clutch is a drive pinion 34 which drives the saw chain 6.

Figure 3:
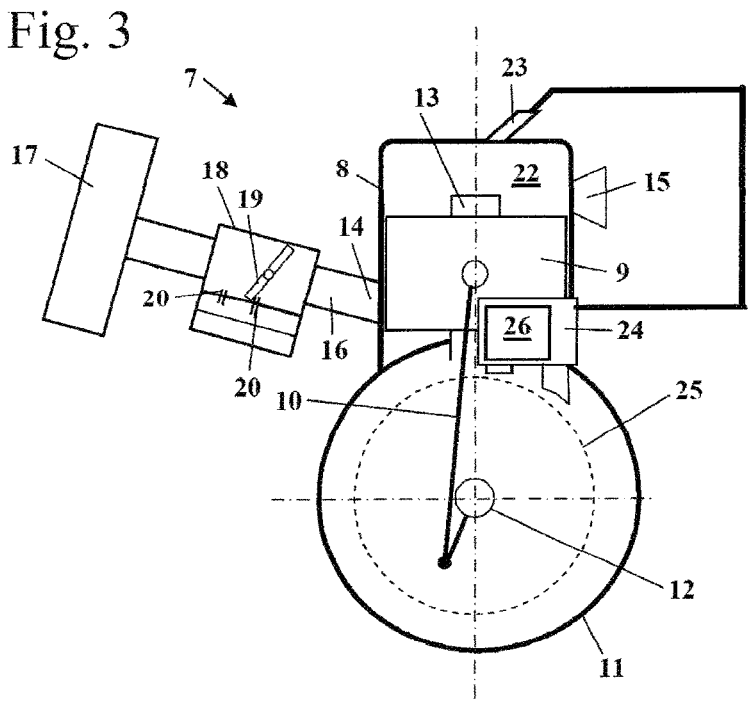
FIG. 3 is a schematic view illustrating certain components of the internal combustion engine of the chainsaw of FIG. 1.

As FIG. 3 shows, the piston 9 defines one side of a combustion chamber 22 formed in cylinder 8 of the internal combustion engine 7. Into the combustion chamber 22 opens at least one transfer channel 13 which connects the combustion chamber 22, in the region of the top dead center of the piston 9, to the interior space of a crankcase 11. The spark plug 23 projects into the combustion chamber 22. From the combustion chamber 22 leads an exhaust outlet 15 whose slot is opened and closed by the piston 9. Into the cylinder 8 also opens an intake manifold 16 having an inlet 14 whose slot is opened and closed by the piston 9.

By means of the intake manifold 16, combustion air is drawn in via an air filter 17. The supplied quantity of combustion air is controlled by a throttle element 19, which is configured as a throttle flap in the exemplary embodiment. According to the exemplary embodiment, the throttle element 19 is arranged in carburetor 18, into which fuel is supplied via one or more fuel openings 20. The fuel is drawn into the intake manifold on account of the negative pressure that develops there. A different type of fuel supply system can alternately be employed and may also be advantageous in some cases.

In the ignition module 24, the ignition voltage for the spark plug 23 is induced by magnets (not shown) arranged on the outer circumference of the flywheel 25. Also integrated into the ignition module 24 is a control device 26 which sets the ignition timing. The control device 26 may alternatively be formed separately from the ignition module 24.

Depending on the fuel used, when the speed drops, in particular, when the throttle element 19 is closed quickly from full load, a lean or rich drop in speed may occur. If a rich mixture is established in the combustion chamber 22 during a drop in speed, then the speed quickly drops very significantly below the idling speed $n_L$ shown in FIG. 4. In the event of a drop in the speed with a lean mixture in the combustion chamber 22, a slow drop in speed results, and the speed n remains for a comparatively long time above the idling speed $n_L$.

Figure 4:
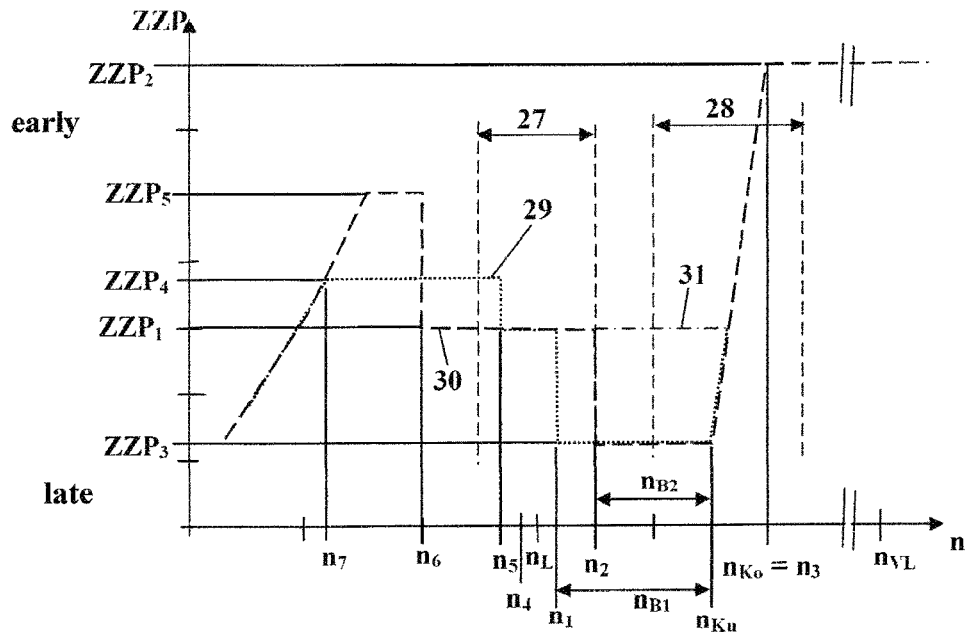
FIG. 4 is a diagram illustrating the characteristic curves for determining the ignition timing (ZZP) depending on the engine speed (n)

In order to reach the idling speed $n_L$ quickly, even in the event of a lean drop in speed, a first characteristic curve 29 (stored in the control device 26) is applied to adjust the ignition timing ZZP in the event of a drop in speed. The first characteristic curve has a first speed region or range $n_{B1}$ between the idling speed $n_L$ and a lower (initial) engagement speed $n_{Ku}$, in which the ignition timing ZZP is adjusted toward "late," to a third ignition timing $ZZP_3$ (FIG. 4). The ignition timing $ZZP_3$ is advantageously between about 3° before top dead center and about 7° before top dead center. A third ignition timing $ZZP_3$ of about 5° before top dead center has proven to be particularly advantageous. At the idling speed $n_L$, the first characteristic curve 29 and a second characteristic curve 30, which is likewise stored in the control device 26, provide a first ignition timing $ZZP_1$, which is advantageously between 10° before top dead center and about 15° before top dead center. A first ignition timing $ZZP_2$ of about 12° before top dead center has proven to be particularly advantageous. At the full load speed $n_{VL}$, only one characteristic curve is provided, this characteristic curve specifying a second ignition timing $ZZP_2$, which may be between about 25° before top dead center and about 30° before top dead center. A second ignition timing $ZZP_2$ of about 28° before top dead center has been found to be particularly advantageous. The characteristic curves assign a fixed ignition timing to each speed of the speed range for which the characteristic curve is provided. The characteristic curves can in this case be stored in the control device as an algorithm, as a table (in the form of speed ranges, to which in each case a constant ignition timing is assigned), as a combination of these data or in some other way.

The engagement of the clutch 33 takes place in a speed range. The clutch engagement process starts at the lower (initial) engagement speed $n_{Ku}$ and ends at an upper engagement speed $_{Ko}$. During acceleration, for the speed range between the lower engagement speed $n_{Ku}$ and the upper engagement speed $n_{Ko}$, the ignition timing is adjusted continuously from the third, "late" ignition timing $ZZP_3$ to the second ignition timing $ZZP_2$, i.e., in the direction toward "early". During deceleration, this adjustment takes place toward "late" in a corresponding manner from the second ignition timing $ZZP_2$ to the third ignition timing $ZZP_3$, so that the first characteristic curve 29 and the second characteristic curve 30 coincide in the speed range between the lower engagement speed $n_{Ku}$ and the upper engagement speed $n_{Ko}$.

Figure 6:
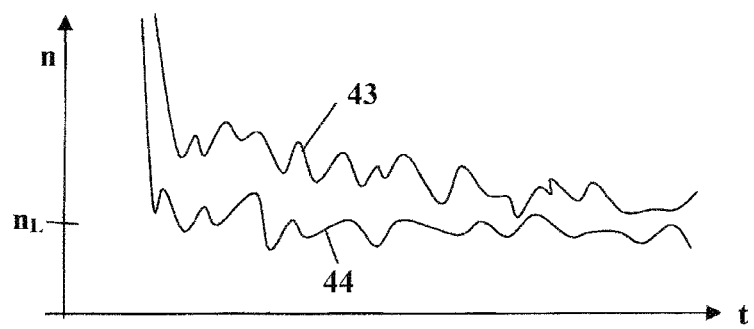
FIG. 6 shows a diagram indicating the speed of the internal combustion engine in relation to time.

A third characteristic curve 31, which indicates the known profile of a characteristic curve for controlling the ignition timing ZZP, is indicated in FIG. 4. The ignition timing remains constant at the first ignition timing $ZZP_1$ from the idling speed $n_L$ to the start of the clutch engagement process. In the case of this profile of the characteristic curve, it takes a comparatively long time during the lean come down for the idling speed $n_L$ to be reached. This is shown schematically in FIG. 6 by way of the curve 43. In contrast, according to the present invention, due to the fact that, in a first speed range $n_{B1}$ between a first speed $n_1$ and the lower engagement speed $n_{Ku}$, the ignition timing is adjusted toward "late," to the third ignition timing $ZZP_3$, the speed drops much more quickly. This is indicated in FIG. 6 by way of the curve 44, which is located below the curve 43 for the time period in consideration. FIG. 6 indicates the speed n in this case over time t.

As FIG. 4 shows, the first speed $n_1$ is above the idling speed $n_L$. The idling speed $n_L$ may be for example about 3000 revolutions per minute, and the first speed $n_1$ is advantageously about 200 revolutions per minute above the idling speed $n_L$. The idling speed $n_L$ can in this case vary, for example, depending on the state of maintenance of the internal combustion engine 7 or of the chainsaw 1, or depending on the environmental conditions. The range within which the idling speed $n_L$ may vary is indicated in FIG. 4 as the speed range 27.

If the speed n drops very quickly below the idling speed $n_L$ during deceleration, the mixture in the combustion chamber 22 is rich. In order to prevent the internal combustion engine 7 from stopping in rich mode, the ignition timing ZZP is adjusted toward "early," to a fourth ignition timing $ZZP_4$ if the speed drops below a fifth speed $n_5$ which is below the idling speed $n_L$. The fourth ignition timing $ZZP_4$ is between the first ignition timing $ZZP_2$ for idling and the second ignition timing $ZZP_2$ for full load. The ignition timing $ZZP_4$ may be, for example, between about 12° and about 18° before top dead center, advantageously at about 15° before top dead center. If the speed drops below a seventh speed $n_7$, the ignition timing is adjusted continuously toward "late" as the speed continues to drop.

Provided for the case of acceleration is a second characteristic curve 30, according to which the ignition timing ZZP is adjusted toward "late", specifically likewise to the third ignition timing $ZZP_3$, in a second speed range $n_{B2}$ between the idling speed $n_L$ and the lower engagement speed $n_{Ku}$. The adjustment to the third ignition timing $ZZP_3$ takes place in this case during acceleration from a second speed $n_2$, which is above the idling speed $n_L$, and above the first speed $n_2$. The second speed $n_2$ may be, for example, about 500 rpm above the idling speed $n_L$. The "late" adjustment takes place until the lower engagement speed $n_{Ku}$ is reached.

Once the engine has been started, ready acceleration must be ensured. To this end, it is provided that the ignition timing is first of all adjusted continuously toward "early" on the basis of the second characteristic curve 30, until the speed assigned to a fifth ignition timing $ZZP_5$ has been reached. The fifth ignition timing $ZZP_5$ may be advantageously between about 17° before top dead center and about 23° before top dead center. A fifth ignition timing of about 20° before top dead center has been found to be particularly advantageous. During further acceleration, the ignition timing is kept constant at the fifth ignition timing $ZZP_5$ until a sixth speed $n_6$ is reached. The sixth speed $n_6$ is between the speeds $n_5$ and $n_7$ and may advantageously be about 2000 rpm. When the sixth speed $n_6$ is reached, the ignition timing is adjusted toward "late" to the first ignition timing $ZZP_1$, until the second speed $n_2$ is reached, and a further "late" adjustment to the third ignition timing $ZZP_3$ takes place.

The engagement speeds $n_{Ku}$ and $n_{Ko}$ can also vary depending on the state of wear of the clutch 33 and on the state of maintenance of the chainsaw 1, specifically in a speed range 28 which is shown schematically in FIG. 4. The speed ranges $n_{B1}$ and $n_{B2}$ are selected such that, even in an unfavorable state of the clutch 33, i.e., a very low initial engagement speed $n_{Ku}$, a "late" adjustment to the ignition timing $ZZP_3$ still takes place, specifically both during acceleration (second characteristic curve 30) and during deceleration (first characteristic curve 29).

Figure 5:
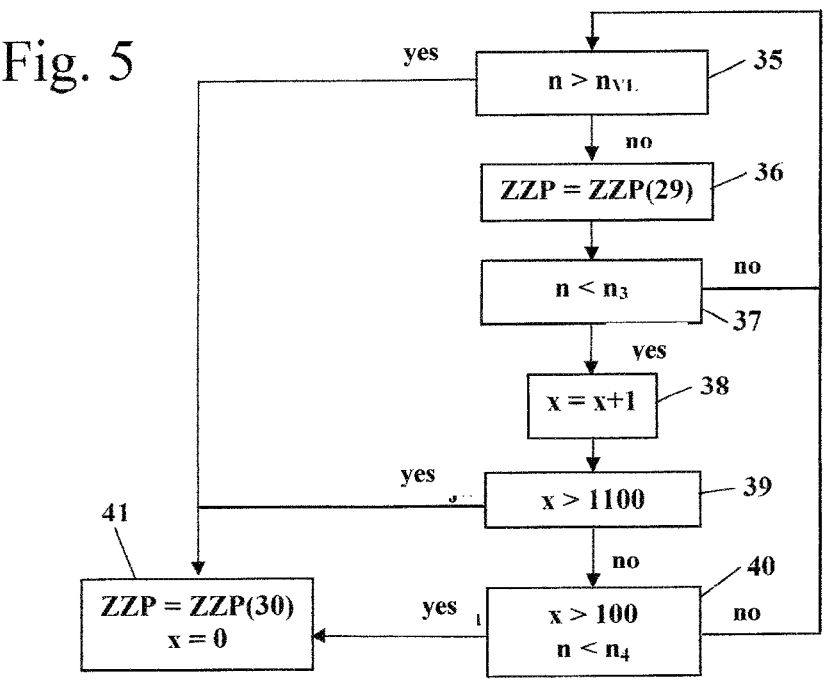
FIG. 5 is a flow diagram illustrating the method according to one embodiment of the invention.

FIG. 5 shows the course of the present method. The method is carried out when the speed n of the internal combustion engine 7 drops from the full load speed $n_{VL}$. In order that the internal combustion engine 7 can accelerate readily again after a deceleration process, it is provided that, after a drop in speed, at which the ignition timing was determined on the basis of the first characteristic curve 29, a switch-over is made from the first characteristic curve 29 to the second characteristic curve 30, when a predefined switch-over criterion is given. In method step 35 a check is carried out as to whether the current speed is above the full load speed $n_{VL}$. If this is the case, then the ignition timing is determined in method step 41 on the basis of the second characteristic curve 30, and the counter x is reset. If the instantaneous speed is below the full load speed $n_{VL}$, then the ignition timing is determined in method step 36 on the basis of the first characteristic curve 29, which coincides with the second characteristic curve 30 at speeds above the upper engagement speed $n_{Ku}$. Subsequently, a check is carried out in method step 37 as to whether the current speed is lower than a third speed $n_3$. In the exemplary embodiment, the third speed $n_3$ coincides with the upper engagement speed $n_{Ko}$. However, the third speed $n_3$ can also be above or below the upper engagement speed $n_{Ko}$. The third speed $n_3$ is higher than the lower engagement speed $n_{Ku}$. If the instantaneous speed n is above the third speed $n_3$, the method begins again at method step 35. If the instantaneous speed n has dropped below the third speed $n_3$, then the counter x is increased by one in method step 38. Subsequently, it is determined whether the counter x is already above a pre-selected numerical value, which is 1100 in the exemplary embodiment. The numerical value corresponds in this case to the number of successive engine cycles during which the ignition timing ZZP has been determined on the basis of the first characteristic curve 29. If the counted value is greater than 1100, then the ignition timing is determined, independently of the instantaneous speed n, in method step 41 on the basis of the second characteristic curve 30, i.e., a switch-over takes place between the characteristic curves 29 and 30 after the expiry of a time which corresponds to 1100 engine cycles.

If the counter is below 1100, i.e., if the internal combustion engine 7 has been controlled over fewer than 1100 cycles on the basis of the first characteristic curve 29, it is determined in the next method step 40 whether the counter is exceeding a second, much lower numerical value, which is 100 in the exemplary embodiment, and whether in addition the speed has dropped below a fourth speed $n_4$. If this is the case, the ignition timing is determined in method step 41 likewise according to the second characteristic curve 30, that is to say switched over between the characteristic curves 29 and 30, and the counter x is reset. The fourth speed is lower than the idling speed $n_L$ and may be, for example, about 100 rpm below the idling speed $n_L$. If the counter x is still below 100 or if the instantaneous speed n is still above the fourth speed $n_4$, then the A method begins again at method step 35.

What is claimed is:

1. A method for operating a working apparatus that includes an internal combustion engine which drives at least one tool via a clutch, wherein the clutch begins a clutch engagement process at an initial engagement speed when the internal combustion engine is accelerated, wherein the internal combustion engine includes a piston, an ignition device and an ignition control device controlling ignition timing to provide a first ignition timing for idling and a second ignition timing for full load operation, wherein the second ignition timing is earlier than the first ignition timing, wherein the method comprises operating the apparatus in a manner that results in a relatively sudden deceleration of the engine, and, in response to said sudden deceleration of the engine, adjusting ignition timing toward "late," with respect to the first ignition timing, when the engine speed drops to a level in a first speed range above the idling speed and below the initial clutch engagement speed.

2. A method according to claim 1, wherein in the first speed range the ignition timing is adjusted to a third ignition timing, which is about 3° to about 8° before top dead center of the piston.

3. A method according to claim 2, wherein said adjusting takes place according to at least a first characteristic curve for decelerating the internal combustion engine which is stored in the control device, said first characteristic curve setting the ignition timing depending on engine speed.

4. A method according to claim 3, wherein, when the speed drops until a first engine speed is reached that is higher than the idling speed, the ignition timing is adjusted to the third ignition timing determined on the basis of the first characteristic curve.

5. A method according to claim 3, wherein a second characteristic curve is stored in the control device, according to which the ignition timing is determined in at least one speed range during acceleration.

6. A method according to claim 5, wherein, above the idling speed and below the initial engagement speed, the ignition timing is adjusted toward "late," with respect to the first ignition timing, wherein the ignition timing is determined on the basis of the second characteristic curve.

7. A method according to claim 6, wherein, above a second speed which is higher than the first speed, the ignition timing is adjusted toward "late," with respect to the first ignition timing, wherein the ignition timing is determined on the basis of the second characteristic curve, and wherein, at speeds which are lower than the second speed and higher than the first speed, the ignition takes place at the first ignition timing wherein the ignition timing is determined on the basis of the second characteristic curve.

8. A method according to claim 5, wherein, in the event of acceleration from the initial engagement speed, the ignition timing is adjusted continuously toward "early" until the second ignition timing is reached, wherein the first characteristic curve and the second characteristic curve coincide at speeds above the initial engagement speed.

9. A method according to claim 5, wherein, in the event of a drop in speed below a third speed which is higher than the initial engagement speed, the ignition timing is first determined on the basis of the first characteristic curve and, after a switch-over criterion has been met, is determined on the basis of the second characteristic curve.

10. A method according to claim 9, wherein said switch-over criterion comprises the dropping of the speed below a fourth speed and the reaching of a first predetermined number of successive engine cycles during which the ignition timing has been determined according to the first characteristic curve.

11. A method according to claim 10, wherein the switch-over criterion further comprises the reaching of a second number of successive engine cycles during which the ignition timing was determined according to the first characteristic curve, wherein the second number of cycles is higher than the first number.

12. A method according to claim 4, wherein, when the speed drops below a fifth speed, the ignition timing is adjusted toward "early," to a fourth ignition timing wherein the ignition timing is determined on the basis of the first characteristic curve, and wherein the fifth speed is lower than the idling speed.

13. A method according to claim 12, wherein, in the event of acceleration from a speed below the idling speed until a fifth ignition timing is reached, the ignition timing is adjusted continuously toward "early," and, after a sixth speed is reached, is adjusted toward "late" to the first ignition timing at which the ignition timing is determined on the basis of the second characteristic curve.

14. A method according to claim 13, wherein the fifth ignition timing is earlier than the fourth ignition timing.

15. A working apparatus, comprising an internal combustion engine and a clutch which drives at least one attachable tool via the clutch, wherein the clutch begins a clutch engagement process at an initial engagement speed when the internal combustion engine is accelerated, wherein the internal combustion engine includes a piston, an ignition device and an ignition control device which is programmed to control ignition timing to provide a first ignition timing for idling and a second ignition timing for full load operation, wherein the second ignition timing is earlier than the first ignition timing, and wherein the ignition control device is further programmed so that, in response to a relatively sudden deceleration of the engine during operation of the apparatus, the ignition control device adjusts ignition timing toward "late," with respect to the first ignition timing, when the engine speed drops to a level in a first speed range above the idling speed and below the initial clutch engagement speed.

16. A working apparatus according to claim 15, which comprises a chainsaw.

* * * * *